US012803445B2

(12) United States Patent
D'Souza et al.

(10) Patent No.: US 12,803,445 B2
(45) Date of Patent: Nov. 17, 2026

(54) COMMUNICATING HEALTH INFORMATION OF A POWER STAGE IN A MULTI-PHASE SWITCHING CONVERTER

(71) Applicant: Shaoxing Yuanfang Semiconductor Co., Ltd., Shaoxing (CN)

(72) Inventors: Arnold J D'Souza, Bangalore (IN); Shyam Somayajula, Bangalore (IN)

(73) Assignee: Ningbo Aura Semiconductor Co., Ltd, Ningbo (CN)

( * ) Notice: Subject to any disclaimer, the term of this patent is extended or adjusted under 35 U.S.C. 154(b) by 210 days.

(21) Appl. No.: 18/631,077

(22) Filed: Apr. 10, 2024

(65) Prior Publication Data

US 2025/0167683 A1 May 22, 2025

(30) Foreign Application Priority Data

Nov. 22, 2023 (IN) ............................ 202341079252

(51) Int. Cl.
*H02M 3/158* (2006.01)

(52) U.S. Cl.
CPC ................................ *H02M 3/1584* (2013.01)

(58) Field of Classification Search
CPC .................................................. H02M 3/1584
See application file for complete search history.

(56) References Cited

U.S. PATENT DOCUMENTS 7,773,350 B2 8/2010 Balakrishnan et al.
11,054,878 B2 7/2021 Wang et al.
11,126,250 B2 9/2021 Muccini et al.
2008/0238655 A1 10/2008 McShane et al.
2012/0013367 A1 1/2012 Chen et al.
2016/0248242 A1 8/2016 Petruzzi et al.
2021/0316637 A1* 10/2021 Slepchenkov .......... B60L 58/26
2021/0359590 A1 11/2021 Low et al.
(Continued)

OTHER PUBLICATIONS

A Smart Solution to Sequence and Monitor Multiple Power Rails in a System, https://www.ti.com/lit/ta/sszta06/sszta06.pdf?ts=1705389137697&ref_url=https%253A%252F%252Fwww.google.com%252F, Jul. 2017, 06 Pages, Texas Instruments, Post Office Box 655303, Dallas, Texas 75265.
(Continued)

*Primary Examiner* — Harry R Behm
(74) *Attorney, Agent, or Firm* — IPHORIZONS PLLC; Narendra Reddy Thappeta

(57) ABSTRACT

A multi-phase switching converter includes a power stage and a phase controller. The power stage is designed to record parameters representing internal health information in the form of a set of bits. The phase controller is designed to control the power stage as well as other power stages to cause the power stages to together generate a regulated power supply. The phase controller drives a first signal to a first state and then a second state to cause the power stage to be in an active state and an inactive state respectively. The power stage transmits the set of bits to the phase controller serially on a first path after the first signal is driven to the first state. In an embodiment, the power stage inserts a bit-boundary indicating logic/voltage level between successive pairs of transmitted bits in the set to signal boundaries between the bits.

18 Claims, 6 Drawing Sheets

(56) References Cited

U.S. PATENT DOCUMENTS

2023/0179099 A1 * 6/2023 Archibald ........... H02M 3/1586

OTHER PUBLICATIONS

Smart Power Stage (SPS) Module with Integrated Thermal Warning and Thermal Shutdown, https://www.onsemi.com/download/data-sheet/pdf/ncv3025833-d.pdf, Sep. 2021, 27 Pages.
4×6 Smart Power-Stage IC with Integrated LDO, Current, and Temperature Sensors, https://www.analog.com/media/en/technical-documentation/data-sheets/max20846.pdf, Jun. 2023, 2 Pages.

* cited by examiner

COMMUNICATING HEALTH INFORMATION OF A POWER STAGE IN A MULTI-PHASE SWITCHING CONVERTER

PRIORITY CLAIM

The instant patent application is related to and claims priority from the co-pending provisional India patent application entitled, "SPS Black Box", Serial No.: 202341079252, Filed: 22 Nov. 2023; which is incorporated in its entirety herewith to the extent not inconsistent with the description herein.

BACKGROUND

Technical Field

Embodiments of the present disclosure relate generally to power supply circuits, and more specifically to communicating health information of a power stage in a multi-phase switching converter.

Related Art

A switching converter refers to a component which generates a regulated DC (direct current) voltage from an input power source by employing one or more switches, as is well known in the relevant arts. Typically, a switching converter transforms the voltage (input supply voltage) of the input power source into a pulsed voltage by operating switch(es), the pulsed voltage then being smoothed using capacitors, inductors, and other elements to generate the regulated DC voltage. Power is supplied from the input to the output by turning ON and OFF switches (e.g., MOSFETs) to generate and regulate the desired voltage. Switching converters are used in components such as regulated power supplies, which in turn are used in devices such as computers and mobile phones, as is also well known in the relevant arts.

A switching converter often contains a pair of power switches driving an inductor. Each power switch (switch) is typically implemented as a transistor (e.g., MOSFET) and the switches are connected in series between input supply voltage and a reference terminal (e.g., ground). The switch coupled closer to the input voltage (source of input power to the converter) is termed as the high-side switch, while the other one is termed as a low-side switch. The switches are operated by a control circuit which switches ON the transistors in successive non-overlapping time durations to cause the switch that is currently ON to drive the inductor in the corresponding duration.

A multi-phase switching converter contains multiple ones of such pairs of switches, along with associated circuitry for each pair. Each pair is typically operated in a corresponding phase of a sequence of phases, with the pairs together operating to generate the desired regulated voltage (supply rail) and capable of supporting higher load currents at greater efficiencies as well as providing other advantages, as is well known in the relevant arts. Each of such pairs, along with the associated circuitry, is referred to as a power stage of a supply rail provided by the multi-phase switching converter. A phase controller operates to control the specific times that each of the power stages of a supply rail is operative in generating the desired output voltage.

A power stage may be implemented to generate and record health information of one or more components or circuitry within it. Health information generally refers to the operational status and/or performance parameters/indicators of components and circuits, and thus to whether such components/circuits are operating as intended. Some examples of health information are failure/fault in components or circuits, currents exceeding permissible limits, input voltage exceeding permissible limit, and early warning of likelihood of temperature, currents and voltages exceeding limits.

Several aspects of the present disclosure are directed to communicating health information of a power stage in a multi-phase switching converter.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A multi-phase switching converter implemented according to an aspect of the present disclosure includes a power stage and a phase controller. The power stage is designed to record parameters representing internal health information in the form of a set of bits. The phase controller is designed to control the power stage as well as other power stages to cause the power stages to together generate a regulated power supply. The phase controller drives a first signal to a first state and then a second state to cause the power stage to be in an active state and an inactive state respectively. The power stage transmits the set of bits to the phase controller on a first path after the first signal is driven to the first state.

In an embodiment, the power stage records the set of bits when in the active state and transmits the set of bits when in the inactive state to the phase controller on a serial path (the 'first path' noted above). The power stage inserts a bit-boundary indicating logic/voltage level between successive pairs of bits in the set to indicate boundaries between the bits. As a result, the power stage is enabled to reliably communicate the set of bits to the phase controller without the need for an additional reference clock.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example System

Figure 1:
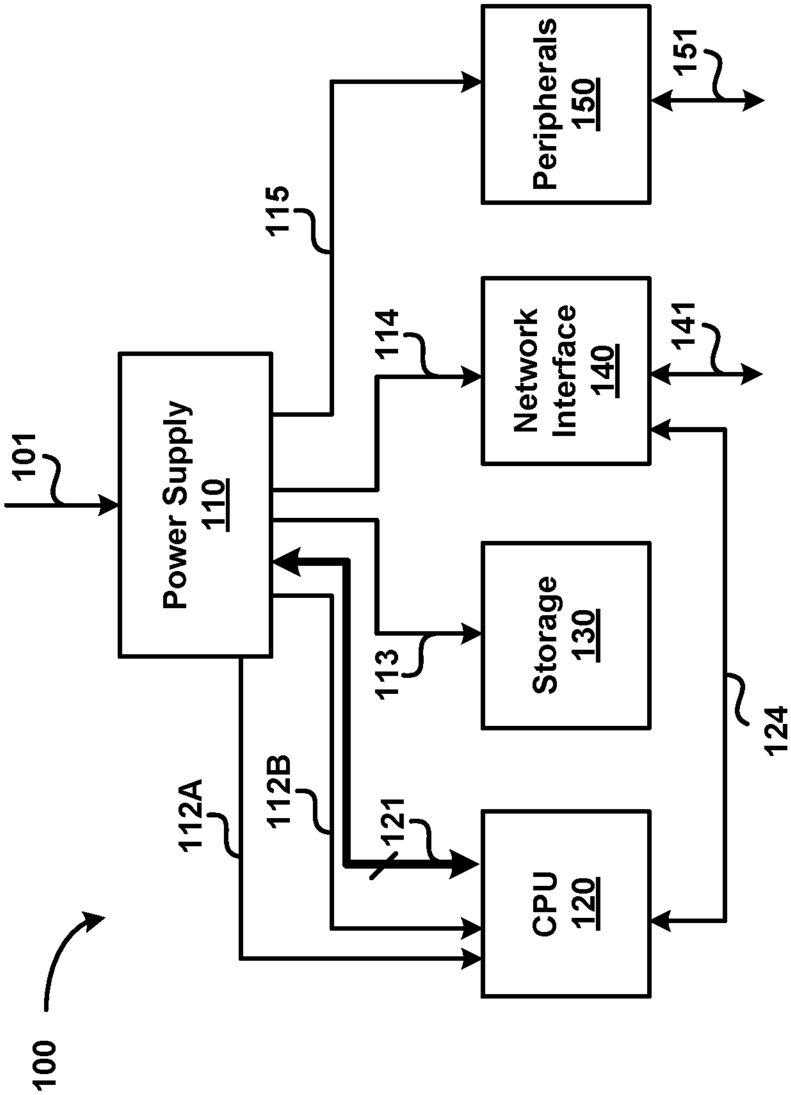
FIG. 1 is a block diagram of an example system in which several aspects of the present disclosure can be implemented.

FIG. 1 is a block diagram of an example system in which several aspects of the present disclosure can be implemented. System 100 is shown containing power supply 110, central processing unit (CPU) 120, storage 130, network interface 140 and peripherals 150. In an embodiment, system 100 corresponds to a computer (desktop, laptop, etc.), although system 100 can represent other types of systems in other embodiments. It is understood that system 100 can contain more or fewer blocks than those shown in FIG. 1.

CPU 120, in general, represents a processor or a system-on-chip (SoC), and is shown as receiving a pair of supply voltages (Va and Vb) on respective paths 112A and 112B from power supply 110. As an example, Va may be a smaller voltage than Vb, and may be used to power a core portion of CPU which may include arithmetic logic unit (ALU), microprogram sequencer, registers, etc. Vb may be used to power the rest of CPU 120, such as for example, input/output (I/O) units, I/O buffers, on-chip peripherals etc. CPU 120 provides various signals (all deemed to be contained in bidirectional path/bus 121) specifying, among others, its power supply requirements to power supply 110. Examples of such signals can be those that specify the specific mode of operation (in terms of power consumption) such as PS1, PS2, PS3, etc., which refer to "Power Save States for Improved Efficiency". CPU 120 receives health information of the power stages from phase controller 210 via bidirectional path/bus 121.

Storage 130 represents a memory that may include both volatile and non-volatile memories. For example, in a personal computer, storage can include magnetic memory (hard disk) as well as solid state memory (RAM, Flash, etc.). Storage 130 is shown receiving a supply voltage on path 113 for powering various circuits and blocks within.

Network interface 140 operates to provided two-way communication between system 100 and a computer network, or in general the Internet. Network interface 140 implements the electronic circuitry required to communicate using a specific physical layer and data link layer standard such as Ethernet or Wi-Fi™. Network interface 140 may also contain a network protocol stack to allow communication with other computers on a same local area network (LAN) and large-scale network communications through routable protocols, such as Internet Protocol (IP). Network interface 140 receives a power supply on path 114 for powering internal circuits and blocks. Network interface 140 receives from/transmits to external systems and CPU 120 respectively on path 141 and path 124.

Peripherals 150 represents one or more peripheral circuits, such as for example, speakers, microphones, user interface devices, etc. Peripherals 150 receives a power supply on path 115, and communicates with external devices on path 151.

Power supply 110 receives power from one or more sources (e.g., battery) on path 101, and operates to provide the desired power supply voltages on paths 112A, 112B, 113, 114 and 115. In an embodiment, power supply 110 is designed to contain one or more multi-phase DC-DC converters within to generate the power supply voltages. Power supply 110 receives signals from CPU 120 received on path 121 that may indicate power-modes in which CPU 120 is to operate in a particular duration, with the power-modes representing a magnitude of power that CPU 120 is likely to require/consume from power supply 110. Power supply 110 responds to the signals by controlling the multi-phase converter(s) to reduce/increase current output based on the specific power-mode signal (e.g., PS1, PS2 and PS3).

In an embodiment, power supply 110 is a voltage regulator module (VRM), sometimes also called processor power module (PPM), and contains one or more step-down switching (buck) converters to generate one or more smaller voltages from a higher-voltage supply source. In other embodiments however, other types of DC-DC converters such as boost, buck-boost, hysteretic converters etc., can be implemented instead of a buck converter. With a VRM, multiple devices/ICs requiring different supply voltages can be mounted on the same platform, for example, a computer motherboard of a personal computer (PC). Accordingly, the description is continued with respect to a VRM as shown in FIG. 2.

3. Voltage Regulator Module (VRM)

Figure 2:
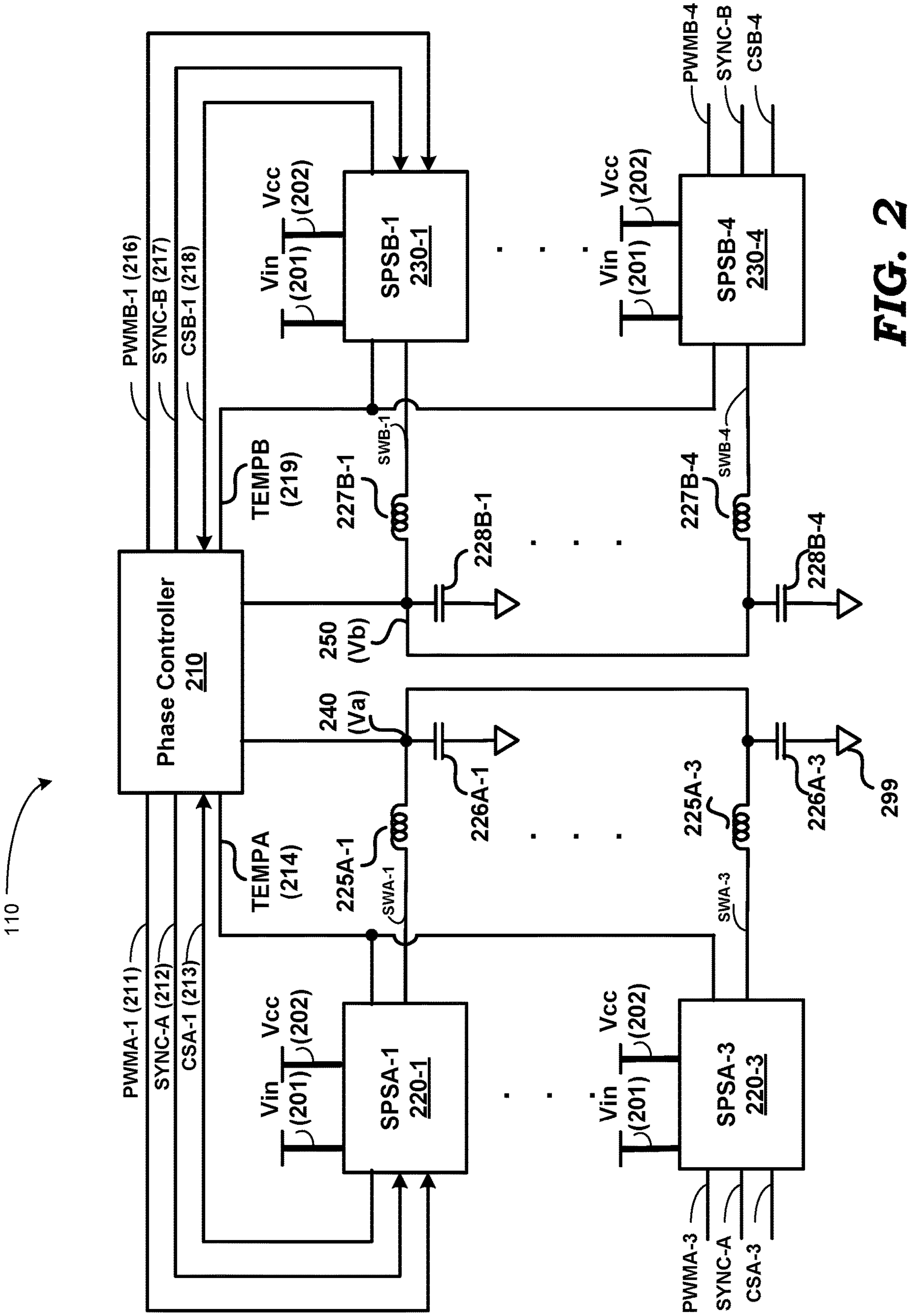
FIG. 2 is a block diagram illustrating the details of a voltage regulation module (VRM) in an embodiment of the present disclosure.

FIG. 2 is a block diagram illustrating the details of a VRM in an embodiment of the present disclosure. Power Supply 110 (of FIG. 1) is a Voltage Regulator Module implemented in the form of a multi-phase switching converter generating two regulated voltages, i.e., two supply rails (power rails), namely Va (240) (Rail-A) and Vb (250) (Rail-B). Nodes 240 and 250 may respectively be also viewed as the power rails. In FIG. 2, the supply source used for deriving Va and Vb is shown numbered 201, and has a voltage Vin. An example value of Vin in an embodiment of VRM 110 is about 21 volts (V). Also shown is a supply voltage Vcc (202), which may be provided by phase controller 210, and which may be used for powering the blocks within each power stage noted below.

VRM 110 is shown containing phase controller 210, smart power stages (SPS) (or 'power stages') SPSA-1 (220-1) through SPSA-3 (220-3), SPSB-1 (230-1) through SPSB-4 (230-4), inductors 225A-1 through 225A-3 and 227B-1 through 227B-4 and capacitors 226A-1 through 226A-3 and 228B-1 through 228B-4. Power supply Va (240) (Rail-A) is generated by a 3-phase buck converter (there are three SPSes—220-1 through 220-3), while power supply Vb (250) (Rail-B) is generated by a 4-phase buck converter (there are four SPSes—230-1 through 230-4). Nodes/Paths 240 and 250 can correspond to paths 112A and 112B of FIG. 1. In the interest of conciseness, other power supply circuits that generate supplies on paths 113, 114 and 115 are not shown in FIG. 2. In alternative embodiments, VRM 110 can have more or fewer power rails as well as power stages per rail.

In an embodiment of the present disclosure, each of the power stages as well as the phase controller is implemented as separate integrated circuits (ICs). However, in other embodiments, the implementations of the power stages and phase controller may be different.

Phase controller 210 in conjunction with one or more power stages of a rail operates to generate a regulated voltage as output. In the example of FIG. 2, phase controller 210 in combination with one or more of power stages SPSA-1 through SPSA-3 operates to generate regulated voltage Va (240). Similarly, phase controller 210 in combination with one or more of power stages SPSB-1 through SPSB-4 operates to generate regulated voltage Vb (250). Accordingly, Va (240) and Vb (250) are shown as being provided as inputs to phase controller 210 to enable operation of one or more feedback loops within phase controller 210 to regulate voltages Va and Vb. Phase controller 210 also receives inductor-current information (regarding current flowing through each of the inductors) from each of the SPSes to enable various operations such as current-mode control of voltage regulation, current limiting, short circuit protection, and balancing the currents generated by each SPS of a same converter (or 'rail') so as to make the currents from each SPS of a rail to be substantially equal in magnitude. The other signals flowing between phase controller 210 and the SPSes are described below.

The combination of (corresponding circuitry within) phase controller 210, an SPS and the corresponding inductor and capacitor forms one "phase" of a rail. Thus, for example, SPSA-1, inductor 225A-1, capacitor 226A-1, and the corresponding portion within phase controller 210 form a single buck converter, and one phase of the 3-phase buck converter. It is noted here that, while each phase is shown as having its own separate capacitor (e.g., 226A-1), in another embodiment, only a single larger capacitor (larger capacitance) may be employed at node 240 (as well as 250). In other embodiments, multiple capacitors are placed close to the load powered by the corresponding supply voltage. For simplicity, an individual SPS is also referred to as a phase of a power-rail.

Each SPS (or in general a 'power stage') may be implemented to contain a high-side switch, a low-side switch, gate-drive circuitry for the two switches, a temperature monitor circuit and an inductor-current-sense circuit/block to provide information indicating the magnitude of inductor-current to phase controller 210. The current supplied by an SPS, and therefore the corresponding inductor-current generally depends on the load current drawn from the supply voltage, although the high-side switch and low-side switch of an SPS may be viewed as 'driving' the inductor. Each SPS receives a source of power (which can all be the same source) as an input which is connected to the high-side switch (shown in detail in sections below).

Each SPS communicates with phase controller 210 via corresponding signals PWM, SYNC, CS and TMP. Thus, SPSA-1 is shown connected to phase controller 210 through signal/paths PWMA-1 (211), SYNC-A (212), CSA-1 (213) and TEMPA (214). SPSA-6 communicates with phase controller 210 via signals PWMA-6, SYNC-A, CSA-6 and TEMPA (214), although in FIG. 2, the respective connections of signals PWMA-6, SYNC-A and CSA-6 to phase controller 210 are not shown. Similarly, SPSB-1 is shown connected to phase controller 210 through signal/paths PWMB-1 (216), SYNC-B (217), CSB-1 (218) and TEMPB (219). SPSB-3 communicates with phase controller 210 via signals PWMB-3, SYNC-B, CSB-3 and TEMPB (219), although in FIG. 2, the respective connections of signals PWMB-3, SYNC-A and CSB-3 to phase controller 210 are not shown. The other SPSes would have similar connections with phase controller 210. In general, each SPS has a PWM, SYNC, CS and TEMP pin for the corresponding connections noted above when implemented as an IC, and the corresponding signals to/from a power stage from/to phase controller 210 may be generally referred to as the PWM, SYNC, CS and TEMP signal corresponding to that power stage.

Signal PWM is an input to an SPS from phase controller 210 and represents a pulse-width modulated (PWM) signal. A PWM signal may be generated to have a logic HIGH state, a logic LOW state or a high-impedance (Hi-Z) state. Typically, the logic HIGH and logic LOW states of the PWM signal correspond respectively to the voltages (within error/noise margins) of the positive and negative rails of the power supply of the circuit generating the PWM signal, and the Hi-Z state corresponds to the mid-rail voltage of the power supply (or a voltage-window around the mid-rail voltage), as is well known in the relevant arts. However, other conventions can be employed for the three states of the PWM signal as would be apparent to one skilled in the relevant arts.

The PWM signal controls the opening and closing of high-side switch and low-side switch of a phase/power stage via the logic HIGH and logic LOW states. Typically, the logic HIGH state is used to switch ON (i.e., close) the high-side switch and switch OFF (i.e., open) the low-side switch (the corresponding duration may be referred as the 'first interval'), while the logic LOW state is used to switch ON the low-side switch and switch OFF the high-side switch (the corresponding duration may be referred as the 'second interval'). Each cycle of the PWM signal has corresponding a 'first interval' and a 'second interval'.

The Hi-Z state of the PWM signal indicates to the power stage that the power stage is not to operate in generating the output voltage, i.e., be 'inactive'. Thus, when PWM is in the Hi-Z state, both the high-side and low-side switches of the stage are OFF, and the power stage can go to low-power/power-down modes. In general, phase controller 210 is designed to generate the PWM signal in a manner capable of indicating three states, with one of the three states indicating that the corresponding power stage is to be inactive. It will be apparent to one skilled in the relevant arts that such tri-state capability can be implemented in other ways. As an example, phase controller 210 can be implemented to generate PWM as a conventional binary signal with the power stages implemented to identify a Hi-Z state if the PWM signal is turned OFF, i.e., not generated at all.

The duty cycle of the PWM signal is set by phase controller 210 and is designed to generate the desired power supply voltage and/or control/change the current supplied by that phase. For example, PWMA-1 would have a duty cycle as required for the magnitude of Va and the current to be provided by SPSA-1. The magnitude of current flowing through the inductor corresponding to a power stage is determined by ON durations of the high-side switch and the low-side switch of that stage, and is set by the stage's PWM input (or control signal in general).

As is well known in the relevant arts, the PWM signals to each SPS of a same converter may be staggered, i.e., delayed with respect to each other in phase such that typically no two high-side switches of a rail (i.e., in respective SPSes) are ON at the same time. Such a technique is employed for reasons such as, for example, to ensure that the peak instantaneous current drawn from Vin is relatively low at all times.

Signal SYNC is a common (single) input (e.g., SYNC-B (217)) to all the SPSes of a power rail, and may be used by phase controller 210 for the purposes of waking-up the corresponding SPSes upon power-up of the power supply 110, and also to indicate the power-mode (e.g., PS2, PS3), i.e., output current requirement, of the multi-phase converter. Signal SYNC is set to the High-impedance (Hi-Z) state to signal that the SPSes are to be shut down, i.e., all SPSes are to become inactive, and the corresponding power supply is not generated. In an embodiment, the Hi-Z state is a voltage level/band between the logic HIGH and logic LOW voltage levels of the SYNC signal. A 'SYNC=Hi-Z' condition is treated as a "chip disable" signal by internal state machines (not shown) in a power stage, and the state machines shut down all the other internal blocks in the power stage.

Signal CS (current-sense) is an input to phase controller 210 from an SPS/phase, and contains information regarding the magnitude of the inductor-current of that phase. The information can be in the form of a current, voltage, digital values, etc., depending on the specific implementation of the power stages and phase controller 210. A CS block in an SPS implements the current-sense operation and sends signal CS to phase controller 210.

In an embodiment of the present disclosure, the current-sense block of a power stage sends the sensed inductor-current information to phase controller 210 in the form of a current that can be of either the same magnitude as the inductor-current or (more typically) be a scaled-down version (in terms of magnitude) of the inductor-current. Correspondingly, in the embodiment, phase controller 210 is designed to receive the information in the form of a current, with the scaling factor being known to phase controller 210 as well as the (corresponding) power stage when scaling is used.

The TEMP pins (or nodes) of all the stages of a rail are wired together, and only a single TEMP input is provided to phase controller 210, as may be observed from FIG. 2. For example, corresponding to rail-B, a single connection TEMPB (219) is provided to phase controller 210 based on the temperatures reported by each power stage of rail-B. Such an approach is usually adopted to minimize the number of wires/PCB (printed circuit board) tracks (and therefore signals) from the power stages of a rail to phase controller 210, as well as to reduce the pinout (number of pins) of phase controller 210. The temperature of a power stage is proportional (has a positive correlation with) the magnitude of the inductor-current of the power stage.

During normal operation of the power stages (in generating a regulated voltage Vb), SYNC-B is not Hi-Z (i.e., SYNC-B is either a logic HIGH or a logic low), and the power stages are termed to be in an 'active state'. In the active state, each of the power stages records health information internally (in the respective power stages) and transmits the health information to phase controller 210. In an embodiment of the present disclosure, each power stage transmits its health information serially in the form of bits to phase controller 210 upon receiving a command to shut-down from phase controller 210. However, in other embodiments, the power stages can be implemented to transmit the health information to phase controller 210 at other points in time, for example, periodically, during normal operation.

The implementation details of a power stage are illustrated next.

4. Power Stage (SPS)

Figure 3:
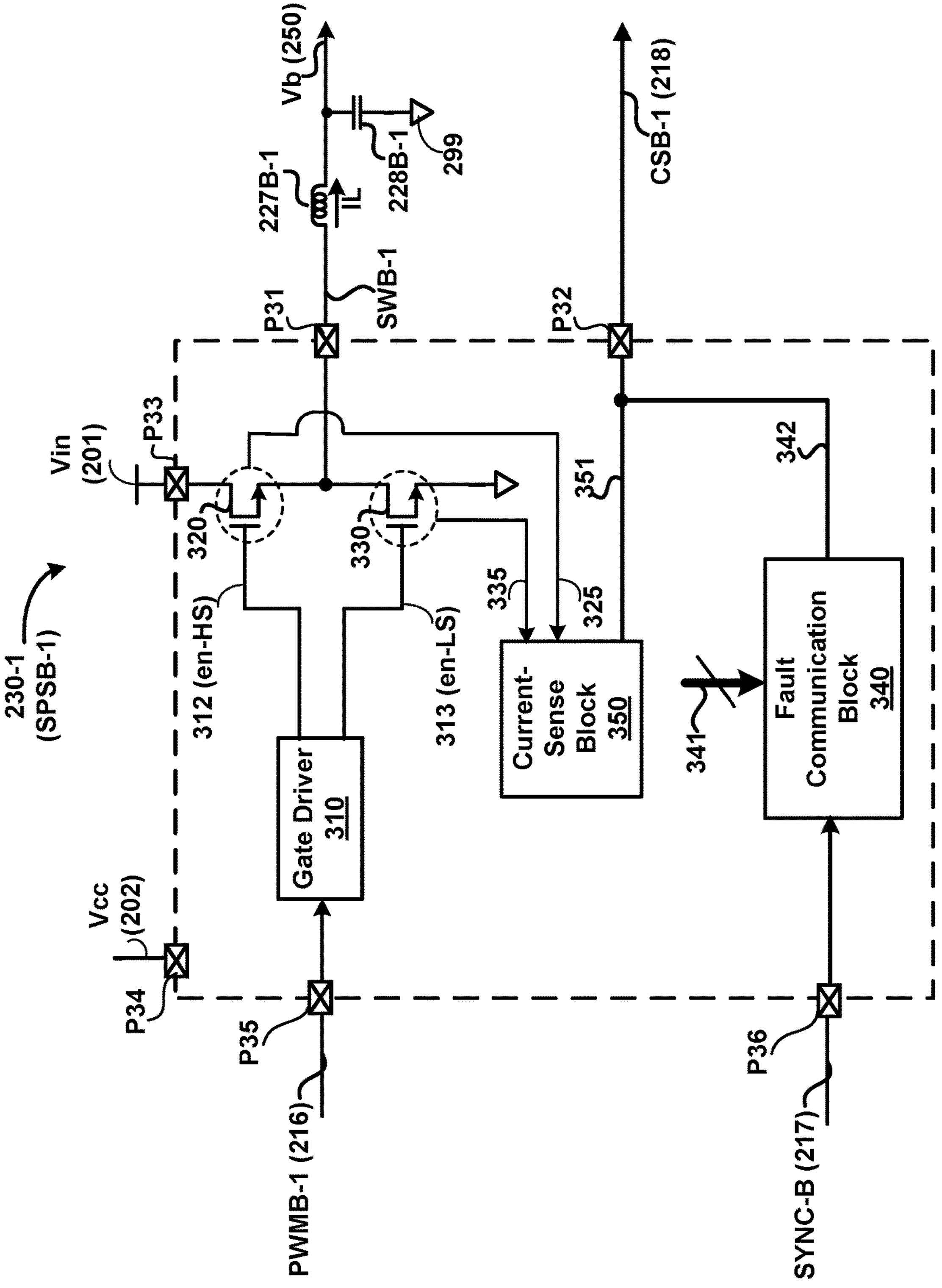
FIG. 3 is a diagram of a power stage in an embodiment of the present disclosure.

FIG. 3 is a diagram illustrating the implementation details of a power stage in an embodiment of the present disclosure. Power stage 230-1 (SPSB-1) of FIG. 2 is shown there containing gate driver 310, high-side (HS) switch 320, low-side (LS) switch 330, fault communication block 340 and current-sense block 350. Also shown in FIG. 3 are inductor 227B-1 and capacitor 228B-1 corresponding to the power stage. P31 through P36 represent pins of SPSB-1 when implemented as an integrated circuit (IC). In alternative implementations, P31 through P36 represent circuit nodes. Current 'IL" represents the inductor-current flowing through inductor 227B-1. Vcc (202) is used to power blocks 310, 340 and 350. The drain terminal of HS switch 320 is connected to Vin (201).

Power stage 230-1, in combination with inductor 325 and capacitor 326, and phase controller 210 provides a regulated voltage (Vb) as output on node 250. Although not shown in FIG. 3 in the interest of conciseness, power stage 300 may contain various other blocks/circuits such as level-converters for gate driver 310, temperature sensors, etc. All the other power stages of FIG. 2 (of rail-B and optionally of rail-A also) may be implemented similar to power stage 230-1 and as further described below.

Gate driver 310 receives a PWM signal PWMB-1 (216) (from phase controller 210), and in response to the logic level of the PWM signal generates the appropriate voltages to turn ON and turn OFF HS switch 320 and LS switch 330 in corresponding intervals and as indicated by the logic levels of the PWM signal. HS switch 320 and LS switch 330 are each shown implemented as an N-channel MOSFET (Metal Oxide Semiconductor Field Effect Transistor) with gate driver 310 driving the gate terminals of the MOSFETs. Other implementations for the switches are also possible. In the example of FIG. 3, when PWMB-1 is a logic HIGH, gate driver 310 generates respective appropriate voltages on paths 312 (en-HS) and 313 (en-LS) to switch-ON MOSFET 320 and switch-OFF MOSFET 330. When PWMB-1 is a logic LOW, gate driver 310 generates respective appropriate voltages on paths 312 and 313 to switch-OFF MOSFET 320 and switch-ON MOSFET 330. When PWMB-1 is a Hi-Z (High-impedance or mid-rail) state, gate driver 310 generates the respective appropriate voltages on paths 312 and 313 to switch-OFF both of MOSFET 320 and 330. Gate driver 310 can be implemented in a known way.

Current-sense block 350 operates to determine the magnitude (for example, instantaneous magnitude) of the inductor-current through inductor 227B-1, and provides information indicating the inductor-current magnitude on its output node (internal to block 350) onto path 351, which is connected to output pin P32. Pin P32 is connected to phase controller 210 by path CSB-1 (218). Current-sense block 450 may determine the magnitude of the inductor-current by one of several known ways. For example, in FIG. 3 current-sense block 350 is shown as receiving inputs 325 and 335 respectively from HS switch 320 and LS switch 330. In an embodiment, signals 325 and 335 represent the respective voltage-drops across the HS and LS switches when the corresponding switch is ON and current is flowing through it and inductor 227B-1. Current-sense block 350 obtains the instantaneous magnitude of the inductor-current (or a scaled-down version thereof) based on the voltage-drops. In an embodiment, current-sense block 350 provides/reports the inductor-current information in the form of a (replica) current (sensed-current) having a magnitude that is scaled-down with respect to the instantaneous inductor-current magnitude. However, in alternative embodiments, current-sense block 350 can be implemented to provide the information in the form of a voltage or a digital value(s). Current-sense block 350 contains an internal switch (or other suitable circuit) to electrically disconnect its output node from path 351, and therefore pin P32, when the inductor-current information is either not needed to be provided on path 351 or when power stage SPSB-1 is in shut-down mode. Such disconnection can be done in a known way, and the mechanism and command for such disconnection is not shown or described herein in the interest of conciseness.

When SYNC-B is a not Hi-Z (i.e., all the power stages of rail-B including power stage SPSB-1 are in the active state), fault communication block 340 records health information generated by corresponding blocks/circuits/components in power stage SPSB-1 in an internal memory, which can include volatile as well as non-volatile memory (storage). In FIG. 3, the health information is shown as being received on paths 341, which may represent one or more separate paths from the corresponding blocks/circuits/components. In an embodiment of the present disclosure, paths 341 receive health information in the form of binary values. As an example, current-sense block 350 may include over-current detection circuitry within it to determine if the inductor-current exceeds a predetermined limit or not. The circuitry generates a binary value to indicate whether or not (logic 1 or logic 0) the limit has been exceeded. Other examples include failure/fault in blocks/circuits/components, Vin (201) exceeding a permissible limit, chip temperature exceeding a permissible limit, etc. Further examples include early warning of likelihood of temperature, currents and voltages exceeding respective limits. The specific circuits that generate such health information are not shown in FIG. 3, but can be implemented in a known way.

In an embodiment, fault communication block 340 receives signal SYNC-B via pin 36. If fault communication block 340 detects that SYNC-B is a Hi-Z, then fault communication block 340 transmits the recorded health information on path 342, and pin P32 to phase controller 210 via path CSB 350-1, prior to transitioning to a powered-down state. As noted above, a Hi-Z state of SYNC-B signal is a command to power stage SPSB-1 (as well as the other power stages of rail-B) to enter into a shut-down mode.

In the shut-down mode, the power stages do not operate to generate an output voltage (here Vb). Instead, in the shut-down mode, all internal blocks of the power stages are powered-down. In other words, the power stages (including SPSB-1) transition to an inactive state/powered-down state. Thus, for example, SPSB-1 does not respond to signal PWMB-1, or send current and/or temperature information back to phase controller 210. All the blocks of SPSB-1 shown in FIG. 3 are powered down.

However, according to an aspect of the present disclosure, upon detecting that SYNC-B is Hi-Z, prior to completely entering the powered-down/inactive state, power stage SPSB-1 and the other power stages of rail-B transmit the respective internally recorded health information to phase controller 210. In an embodiment, internal blocks other than fault communication block 340 may be powered down immediately upon (or shortly after) SYNC-B becoming Hi-Z, with only fault communication block 340 remaining powered-UP until it has finished transmitting all the recorded health information, upon which fault communication block 340 is also powered-down. In another embodiment, all (or at least multiple other) blocks may remain powered-ON until fault communication block 340 has finished transmitting all the recorded health information. Thereafter, the blocks that have not yet been powered-down are powered-down. Such powering down of the internal blocks may be done by a power management block (not shown) in each power stage. When fault communication block 340 is to transmit health information on path 342 and onto pin P32 and path CSB-1 (218), the output of current-sense block 350 is disconnected (or is already disconnected) from path 351. Similarly, when current-sense block 350 is to transmit sensed inductor-current information on path 351 (when SYNC-B is a logic HIGH), and onto pin P32 and path CSB-1 (218), the output of fault communication block 340 is electrically disconnected from path 342 (e.g., internally by a switch). Although not shown in FIG. 3, as noted above, in an embodiment, power stage SPSB-1 contains internal state machines for detecting a ‘SYNC-B-Hi-Z’ condition. In response to detecting that SYNC-B is a Hi-Z, the state machines power-down down all the other internal blocks in SPSB-1.

It may be appreciated that only a single data path/line (CSB-1) is available for transmitting the health information in the form of binary values serially, and no clock is available as reference for a synchronous communication. According to an aspect of the present disclosure, fault communication block 340 employs a communication protocol for sending the health information that enables phase controller 210 to correctly receive the health information data on a single serial path without the need for a reference clock, as described next.

4. Communication Protocol

Figure 4:
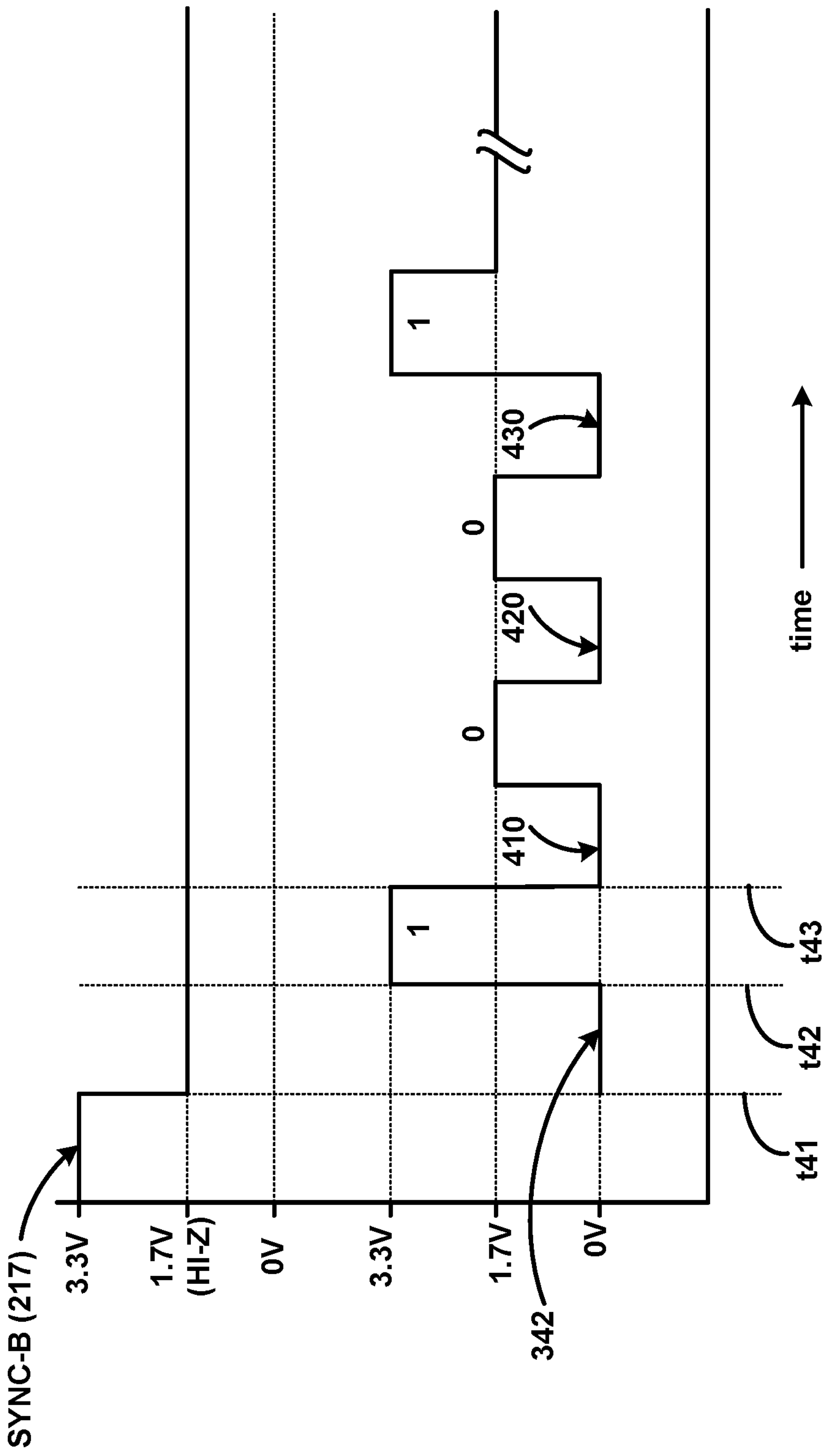
FIG. 4 is a timing diagram illustrating the manner in which fault information is communicated by a power stage to a phase controller, in an embodiment of the present disclosure.

FIG. 4 is a timing diagram showing the waveforms of SYNC-B (217) and the serial health information bits on path 342 in an embodiment of the present disclosure. It is noted here that although the logic HIGH, logic LOW and Hi-Z durations of waveform 342 are shown to be equal, such durations can in general be unequal also.

In the example of FIG. 4, a logic 1 is indicated by a voltage greater than 2.4V (i.e., a voltage range/band of 2.4V to 3V), a logic 0 is indicated by a voltage of 1.7V (or a range about 1.7V, such as for example 1.7V+/−500 millivolts), and a bit-boundary is indicated by 0V (or a range from 0V to 0.8V, for example). It must however be understood that the three voltage levels (or ranges) indicated in the Figure for a logic 1, a logic 0 and a bit-boundary are merely to illustrate. It would be understood by a person skilled in the relevant arts that other voltage levels or ranges can also be used to indicate the three states (i.e., logic 1, logic 0 and bit-boundary). As an example, a logic 1 can be indicated by a voltage of 3.3V, a logic 0 by a voltage of 0V and a bit-boundary state by a voltage of 1.7V (although in practice all three voltages may be voltage bands bordering or including the voltages).

SYNC-B is shown to be not in Hi-Z until t41. Instead, SYNC-B is shown as a logic HIGH until t41 (although in general, SYNC-B could be either a logic HIGH or a logic LOW). At t41, SYNC-B transitions to the high-impedance (Hi-Z) state. The logic HIGH/1, Hi-Z and logic LOW/0 states of signal SYNC-B are respectively represented by voltages which are nominally 3.3 Volts (V), 1.7V and 0V, although in practice each state will be represented by a small band of voltages about (or one side only—above or below) the corresponding nominal voltage.

In response to transition of SYNC-B to Hi-Z state at t41, power stage SPSB-1 prepares to enter the shut-down/inactive mode, in which most or all the components/circuits in the power stage are powered-down. However, fault communication block 340, prior to entering the shut-down mode transmits the recorded health information serially on path 342. Accordingly, fault communication block 340 is shown starting transmission of the bits starting at t42.

Prior to t41, there is no signal output by fault communication block 340, and hence in FIG. 4 no signal magnitude is shown for signal 342, although path 342 may have a voltage depending on the output of current-sense block 350.

Signal 342 is indicated as commencing with a magnitude corresponding to the 'bit-boundary indicating' state of 0V, which may be viewed as indicating that transmission of the health information is about to start (i.e., a 'start of transmission' indication).

The first four example bits of the health information are shown being transmitted in FIG. 4, and the bits are 1, 0, 0 and 1, as also indicated in the Figure. The first logic 1 health information bit is shown to have a duration of time interval t42-t43. It may be observed that between each successive pairs of bits, signal 342 assumes the bit-boundary indicating state which has a voltage substantially equal to 0V (or within a voltage band from 0V to 1V, as an example). Thus, the voltage of 0V (or a corresponding band) signals a boundary between a consecutive pair of health information bits. Intervals 410, 420 and 430 represent the bit-boundaries in FIG. 4. Further, the initial magnitude of 0V (in interval t41-t42) signals the start of the transmission of the health information bits.

In the example of FIG. 4, the durations (widths) of a health information bit (logic 1 or logic 0) and bit-boundaries are shown as being equal. However, in general, these durations need not be equal, and may be chosen as suited to the specific environment.

Due to the use of a third state (approximately 0V) to indicate a boundary between two successive health information bits, phase controller 210 can reliably determine the end of one bit and the start of the next bit without the need for a reference clock. The duration for which signal 342 remains at the bit-boundary indicating state between a pair of consecutive health information bits may be equal to or different from the duration of each health information bit, but of sufficient duration as to enable phase controller 210 to reliably receive the bits. The bit-boundary indicating state between each pair of consecutive bits represents an "embedded transition information" in the bit stream and therefore enables the health information bits to be transmitted and reliably received without the need for an additional reference clock. In an embodiment, the duration of a health information bit is 200 nano-seconds (ns), the duration of the bit-boundary indicating state is also 200 ns, and power stage SPSB-1 records (and transmits) 16 bits of health information, each bit representing a different condition.

The implementation details of fault communication block 340 in an example embodiment are described next.

5. Fault Communication Block

Figure 5:
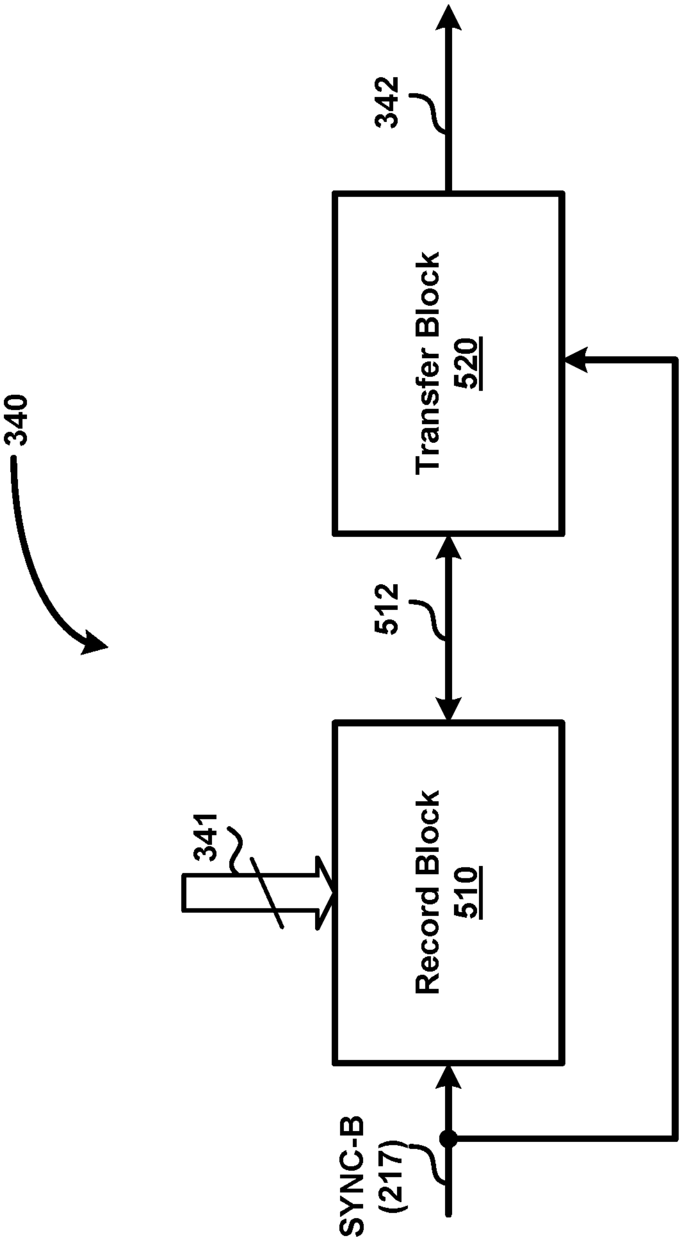
FIG. 5 is a block diagram of the implementation details of a fault communication block of a power stage, in an embodiment of the present disclosure.

FIG. 5 is a block diagram illustrating the internal implantation details of fault communication block 340 in an embodiment of the present disclosure. Fault communication block 340 is shown there containing record block 510 and transfer block 520.

Record block 510 receives SYNC-B on path 217, and determines the logic/voltage level of SYNC-B. Accordingly, record block 510 contains corresponding circuitry to make such a determination. Such level/voltage determining circuitry can be implemented in a known way. For example, such circuitry may be implemented using a pair of comparators and a decoder similar to that described above with respect to phase controller 210. Upon SYNC-B transitioning to logic HIGH (as would happen sometime subsequent to power-ON, reset or power-cycling of switching converter 110), record block 510 starts storing/recording health information bits receiving on paths 341 from corresponding internal circuitry in power stage SPSB-1. Alternatively, instead of starting storing of health information upon power-ON, reset or power-cycling, record block 510 records health information whenever SYNC-B is either a logic-HIGH or a logic-LOW.

In an alternative embodiment, fault communication block 340 does not directly receive SYNC-B. Instead, SPSB-1 is implemented to contain internal state machines (as noted above), which send a signal to fault communication block 340 indicating whether SPSB-1 is to operate in the active state or be powered-down based on the state of SYNC-B.

In an embodiment, record block 512 provides the determined level/voltage of SYNC-B (or similar information received from the internal state machines) to transfer block via path 512.

As noted above, record block 510 may store the received bits in an internal volatile and/or non-volatile memory. In an embodiment, the memory is designed to be/contain a sticky-bit register to store 16 health information bits. A sticky-bit register refers to a register designed to store only a first change in a bit, disabling any future changes to that bit. To clarify, if a fault indication on path 341 causes one of the 16 bits in the sticky-bit register to change from logic 0 (no fault) to logic 1 (fault), any further change to that bit is not recorded. Thus, even if the fault were to be temporary and gets resolved (with the fault indication no longer indicating a fault), the stored logic 1 is not changed to logic 0.

Transfer block 520 is shown connected to record block 510 via bidirectional path (which may be one-bit or several-bits wide), and to path 217 (SYNC-B). Transfer block 520 receives the level/voltage of SYNC-B from record block 510 or from the internal state machines. However, in an alternative embodiment, transfer block 520 contains circuitry to determine the level/voltage of SYNC-B received on path 217.

Upon SYNC-B transitioning to, and remaining in Hi-Z state for a predetermined duration (e.g., interval t41-t42 or a shorter interval), record block 510 sends the recorded bits to transfer block 520 on path 512. Transfer block 520 serially transmits the received health information bits in the manner illustrated in FIG. 4.

In an embodiment, starting at t42 (FIG. 4), record block 520 forwards the contents of the sticky-bit register (16-bits wide) to transfer block 520. Transfer block 520 contains in internal clock generator (not shown) to generate a transmit clock. Transfer block 520 transmits the received health information bits along with the bit-boundary indicating state (0V) inserted between successive pairs of bits (in the manner illustrated in FIG. 4), at the rate of the transmit clock. In an embodiment, the transmit clock has a frequency of 5 Mega Hertz (MHz), and the therefore the effective transfer rate of the health information bits alone (excluding the bit-boundary indicating states) is 2.5 Mega bits/second.

Record block 510 and transfer block 520 can be implemented in a known way.

Relevant portions of the internal details of phase controller in an example embodiment are described next.

6. Phase Controller

Figure 6:
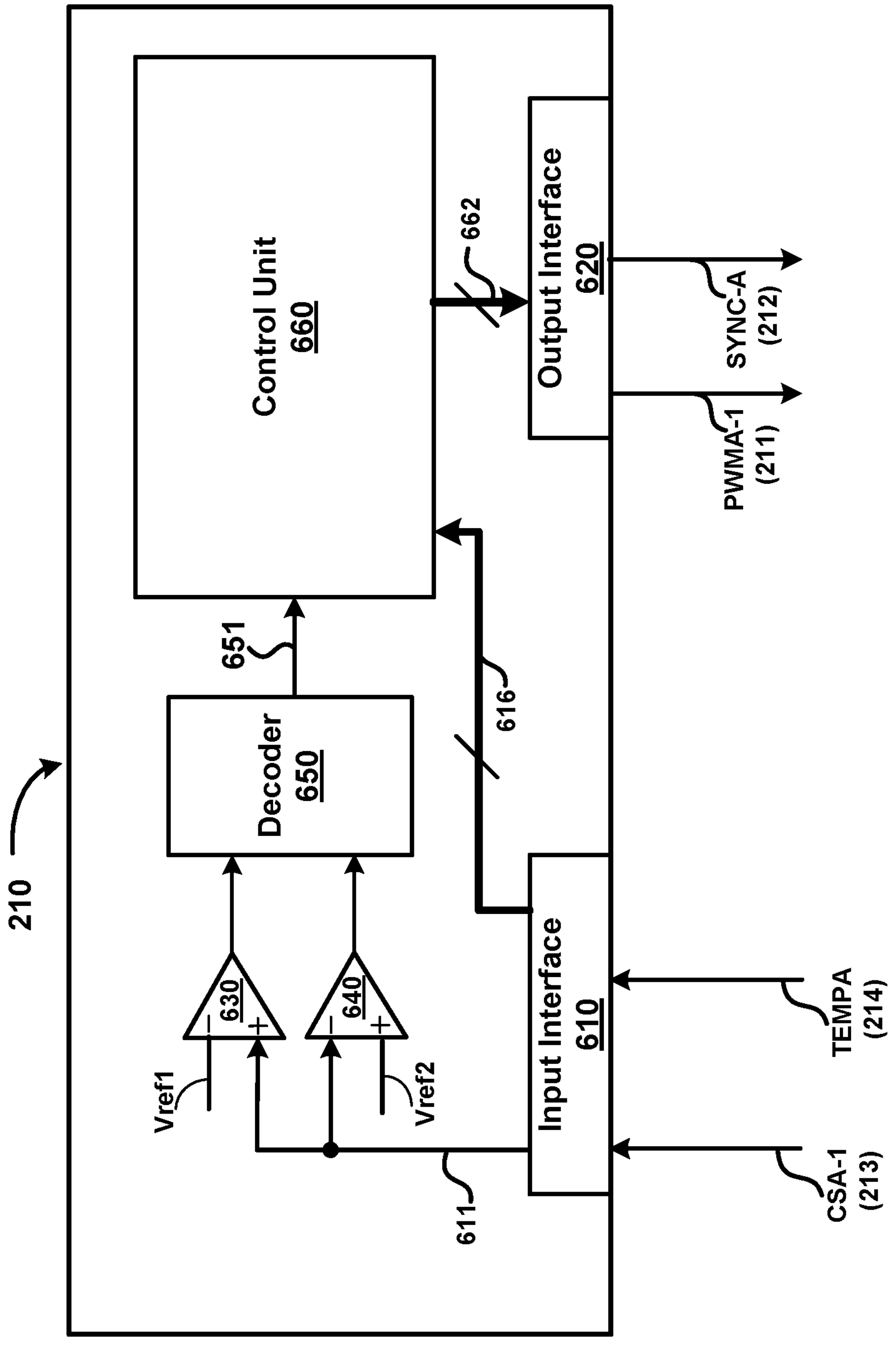
FIG. 6 is a block diagram illustrating partial implementation details of a phase controller of a VRM, in an embodiment of the present disclosure.

FIG. 6 is a block diagram illustrating some relevant blocks of phase controller 210, which is shown containing input interface 610, output interface 620, comparators 630 and 640, decoder 650 and control unit 660. Only those details as relevant to the disclosure herein are shown.

Control unit 660 operates to control the power stages of the respective rails shown in FIG. 2 to generate the respective regulated supply voltages Va and Vb. Accordingly, for example, control unit 660 performs closed loop control for causing the generation of regulated voltages Va and Vb, control loops for equalizing the currents delivered by each power stage of a rail, various safety features based on the health information received from the power stages as described herein, etc. Control unit 660 may perform various other operations although these are not described here, nor are the corresponding input/output connections or circuitry shown, in the interest of conciseness and clarity. Control unit 660 is shown receiving input signals on paths 651 and 616, and sending output signals on path 662. Each of paths 662 and 616 may represent multiple paths. Control unit 660 operates on the received input signals to perform the operations noted above, and generates output signals for transmission to power stages on paths 662. Thus, among other signals, control unit 660 generates and forwards signals SYNC-B and PWMB-1 on paths 662.

Output interface 620 is shown receiving output signals 662 from control unit 660. Output interface 620 contains circuitry (e.g., one or more of buffers, pin-multiplexers, level-shifters and signal conditioning circuits) for receiving and forwarding the signals 622 to corresponding power stages, with the forwarded signals generated to conform to desired specifications. However, in the interest of simplicity and clarity, only signals PWMB-1 (216) and SYNC-B (217) are shown as being output by output interface 620.

Input interface 610 receives signals from the power stages, although only signals CSB-1 (218) and TEMPB (219) are shown for simplicity. Input interface 610 contains circuitry (e.g., one or more of buffers, pin-multiplexers, and signal conditioning circuits) for receiving and processing/conditioning (per desired specifications) the corresponding input signals. Input interface 610 forwards the processed/conditioned signals to corresponding blocks (not all of which are shown) in phase controller 210. In particular, input interface 610 forwards the health information bits received on CSB-1 (218) on path 611, and the other signals on paths 616.

Wire/path 611 is connected to the non-inverting terminal of comparator 630 and to the inverting terminal of comparator 640. The inverting terminal of comparator 630 is connected to a 2 volts (V) reference voltage (Vref1), and the non-inverting terminal of comparator 640 is connected to a 1V reference voltage (Vref2). The reference voltages may be generated internally by voltage references.

Decoder 650 receives the outputs of comparators 630 and 640, and operates to (re) generate the received health information bits on path 651, as described below.

In operation, when the received health information bit is a logic 1 (path CSB-1 is at 3.3V and therefore the voltage on path 611 is also 3.3V), the outputs of comparators 630 and 640 are respectively (binary) logic 1 and logic 0. When the health information bit is a logic 0 (path CSB-1 is at 1.7V, and therefore the voltage on path 611 is also 1.7V), the outputs of comparators 630 and 640 are both logic 0. When path CSB-1/611 are at 0V (signaling the boundary between a pair of consecutive bits), the outputs of comparators 630 and 640 are respectively a logic 0 and a logic 1. Decoder 650 is designed to determine a transmitted bit to be a logic 1 when the outputs of the comparators 630 and 640 are respectively a logic 1 and a logic zero, a logic 0 when the outputs of both comparators 630 and 640 are a logic 0, and a bit-boundary when the outputs of comparators 630 and 640 are logic 0 and logic 1 respectively. Decoder 650 forwards the received health information bits to control unit 660 on path 651. Other implementations in phase controller 210 are also possible to correctly detect the transmitted health information bit, as would be apparent to one skilled in the relevant arts upon reading the disclosure herein.

Thus, it is possible to identify faults and/or obtain performance data from a power stage without having to manually or otherwise probe nodes in the power stage or without having to implement the power stage to have additional pins or interfaces to transmit health information.

Control unit 660 may store the health information bits in a volatile or non-volatile memory (not shown) in phase controller 210. CPU 120 (FIG. 1) may obtain the health information bits from phase controller 210 (or specifically, from control unit 660) via path 121, and indicate the health information to a user on a suitable user interface (e.g., screen), thereby enabling the user to take appropriate corrective action or monitor the performance indicators of the respective power stages.

7. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 3, 5 and 6, although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A multi-phase switching converter comprising:

a power stage to record parameters representing internal health information in the form of a set of bits; and a phase controller to control a plurality of power stages including said power stage to cause said plurality of power stages to together generate a regulated power supply, said phase controller driving a first signal to a first state starting from a first time instance and then a second state starting from a second time instance to cause said power stage to be in an active state between said first time instance and said second time instance, and in an inactive state starting from said second time instance, wherein said power stage is operative in contributing to generation of said regulated power supply in said active state, and is not operative in contributing to generation of said regulated power supply in said inactive state, wherein said power stage records said set of bits in a duration between said first time instance and said second time instance when said first signal is in said first state, wherein said power stage transmits said set of bits to said phase controller on a first path when said first signal is in said second state.

2. A multi-phase switching converter comprising:

a power stage to record parameters representing internal health information in the form of a set of bits; and a phase controller to control a plurality of power stages including said power stage to cause said plurality of power stages to together generate a regulated power supply, said phase controller driving a first signal to a first state and then a second state to cause said power stage to be in an active state and an inactive state respectively, wherein said power stage records said set of bits when said power stage is in said active state in response to said first signal being driven to said first state, wherein said power stage transmits said set of bits to said phase controller on a first path after said first signal is driven to said second state from said first state, wherein said power stage comprises:

a high-side switch and a low-side switch to respectively drive an inductor in a first interval and a second interval periodically based on a control signal received from said phase controller, wherein a magnitude of current flowing through said inductor is determined by ON durations of said high-side switch and said low-side switch as set by said control signal, wherein said power stage measures said magnitude and transmits information representing said magnitude on said first path when in said active state.

3. The multi-phase switching converter of claim 2, wherein said power stage completes entering a shutdown mode after completion of transmission of said set of bits in response to said first signal being driven to said first state, wherein said power stage transmits said set of bits according to a protocol, wherein said protocol comprises:

driving said first path to a first voltage level to signal a logic 1 for a bit;

driving said first path to a second voltage level to signal a logic 0 for a bit; and driving said first path to a third voltage level to signal a boundary between a consecutive pair of bits.

4. The multi-phase switching converter of claim 3, wherein said third voltage level is below said first voltage level and said second voltage level, and wherein said first state is one of a logic high and a logic low, while said second state is a high impedance (Hi-Z) state.

5. The multi-phase switching converter of claim 4, wherein said power stage indicates a start of transmission of said set of bits by driving said first path to said third voltage level.

6. The multi-phase switching converter of claim 5, wherein said internal health information includes faults in components or circuits in said power stage, said magnitude of current flowing through said inductor exceeding a corresponding limit, and early warning of likelihood of one or more of a temperature of said power stage and said magnitude of current flowing through said inductor exceeding corresponding limits.

7. The multi-phase switching converter of claim 2, wherein said first path is coupled between an output pin of said power stage and an input pin of said phase controller.

8. A power stage comprising:

a high-side switch and a low-side switch to respectively drive an inductor in a first interval and a second interval periodically based on a control signal received from a phase controller, wherein a magnitude of inductor-current flowing through said inductor is determined by ON durations of said high-side switch and said low-side switch as set by said control signal, wherein said phase controller controls a plurality of power stages including said power stage to cause said plurality of power stages to together generate a regulated power supply; and a fault communication block to record parameters representing internal health information in the form of a set of bits, wherein said phase controller drives a first signal to a first state and then a second state to cause said power stage to be in an active state and an inactive state respectively, wherein said fault communication block records said set of bits when said power stage is in said active state in response to said first signal being driven to said first state, wherein said fault communication block transmits said set of bits to said phase controller on a first path after said first signal is driven to said second state from said first state, said power stage further comprising a current-sense block to measure said magnitude of said inductor-current, said current-sense block to transmit information representing said magnitude on said first path when said power stage is in said active state.

9. The power stage of claim 8, wherein said power stage completes entering a shutdown mode after said fault communication block completes transmission of said set of bits in response to said first signal being driven to said first state, wherein said fault communication block transmits said set of bits according to a protocol, wherein said protocol comprises:

driving said first path to a first voltage level to signal a logic 1;

driving said first path to a second voltage level to signal a logic 0; and driving said first path to a third voltage level to signal a boundary between a consecutive pair of bits.

10. The power stage of claim 9, wherein said third voltage level is below said first voltage level and said second voltage level, wherein said first state is one of a logic high and a logic low, while said second state is a high impedance (Hi-Z) state.

11. The power stage of claim 8, wherein said first path is coupled between an output pin of said power stage and an input pin of said phase controller.

12. The power stage of claim 11, wherein said fault communication block indicates a start of transmission of said set of bits by driving said first path to said third voltage level.

13. The power stage of claim 12, wherein said internal health information includes faults in components or circuits in said power stage, said magnitude of inductor-current exceeding a corresponding limit, and early warning of likelihood of one or more of a temperature of said power stage and said magnitude of inductor-current exceeding corresponding limits.

14. A phase controller coupled to a power stage, said phase controller to control operation of said power stage to cause said power stage to generate a regulated power supply, wherein said power stage is designed to record parameters representing internal health information in the form of a set of bits, said phase controller comprising:

a control unit to drive a first signal to a first state and then a second state to cause said power stage to be in an active state and an inactive state respectively; and an input interface to receive said set of bits on a first path when said power stage transmits said set of bits to said phase controller on said first path after said first signal is driven to said second state from said first state, wherein said power stage records said set of bits when said power stage is in said active state in response to said first signal being driven to said first state, wherein said power stage completes entering a shutdown mode after completion of transmission of said set of bits in response to said first signal being driven to said first state, wherein said power stage transmits said set of bits according to a protocol, wherein said protocol comprises:

driving said first path to a first voltage level to signal a logic 1 for a bit;

driving said first path to a second voltage level to signal a logic 0 for a bit; and driving said first path to a third voltage level to signal a boundary between a consecutive pair of bits.

15. The phase controller of claim 14, further comprising:

a first comparator having an inverting terminal coupled to a first reference voltage, and a non-inverting terminal coupled to said first path, said first comparator to generate a logic high, a logic low and a logic low respectively as a first comparison output if a voltage level on said first path is said first voltage level, said second voltage level and said third voltage level respectively;

a second comparator having an inverting terminal coupled to said first path, and a non-inverting terminal coupled to a second reference voltage, said first comparator to generate a logic low, a logic low and a logic high respectively as a second comparison output if said voltage level on said first path is said first voltage level, said second voltage level and said third voltage level respectively; and a decoder to receive said first comparison output and said second comparison output, said decoder to determine a transmitted bit to be a logic 1 when said first comparison output and said second comparison output are respectively a logic 1 and a logic 0, said decoder to determine said transmitted bit to be a logic 0 when said first comparison output and said second comparison output are both a logic 0, said decoder to determine a bit-boundary when said first comparison output and said second comparison output are respectively a logic 0 and a logic 1.

16. The phase controller of claim 15, wherein said third voltage level is below said first voltage level and said second voltage level, and wherein said first state is one of a logic high and a logic low, while said second state is a high impedance state.

17. The phase controller of claim 16, wherein said first path is coupled between an output pin of said power stage and an input pin of said phase controller.

18. The phase controller of claim 17, wherein said internal health information includes faults in components or circuits in said power stage, a magnitude of inductor-current through an inductor coupled to said power stage exceeding a corresponding limit, and early warning of likelihood of one or more of a temperature of said power stage and said magnitude of inductor-current exceeding corresponding limits.

* * * * *